United States Patent [19]

Miller et al.

[11] 4,109,628

[45] Aug. 29, 1978

[54] ADJUSTABLE REGULATION GOVERNOR

[75] Inventors: Robert H. Miller, Peoria; Harold C. Davidson, Chillicothe, both of Ill.

[73] Assignee: Caterpillar Tractor Co., Peoria, Ill.

[21] Appl. No.: 739,419

[22] Filed: Nov. 8, 1976

[51] Int. Cl.[2] .......... F02D 1/04; F16H 55/16

[52] U.S. Cl. .......... 123/140 R; 74/89.15; 74/441

[58] Field of Search .......... 123/140 R, 140 FG; 74/89.15, 409, 441

[56] References Cited

U.S. PATENT DOCUMENTS

| | | | |
|---|---|---|---|
| 2,159,863 | 5/1939 | Schilling | 123/140 R |
| 3,532,082 | 10/1970 | Clouse | 123/140 R |
| 3,599,499 | 8/1971 | Steiner | 74/89.15 |
| 3,798,984 | 3/1974 | McMinn | 74/89.15 |
| 4,005,493 | 1/1977 | Morgan | 74/441 |
| 4,026,260 | 5/1977 | Kleimenhagen et al. | 123/140 R |

FOREIGN PATENT DOCUMENTS

| | | | |
|---|---|---|---|
| 359,585 | 10/1931 | United Kingdom | 123/140 R |

*Primary Examiner*—Charles J. Myhre
*Assistant Examiner*—P. S. Lall
*Attorney, Agent, or Firm*—Phillips, Moore, Weissenberger, Lempio & Majestic

[57] ABSTRACT

A governor mechanism for a fuel injection pump is of the type having interacting fly-weights and a main governor spring for regulating engine speed, and means are included for selectively changing the spring rate of the main governor spring to change the regulation of the governor.

12 Claims, 5 Drawing Figures

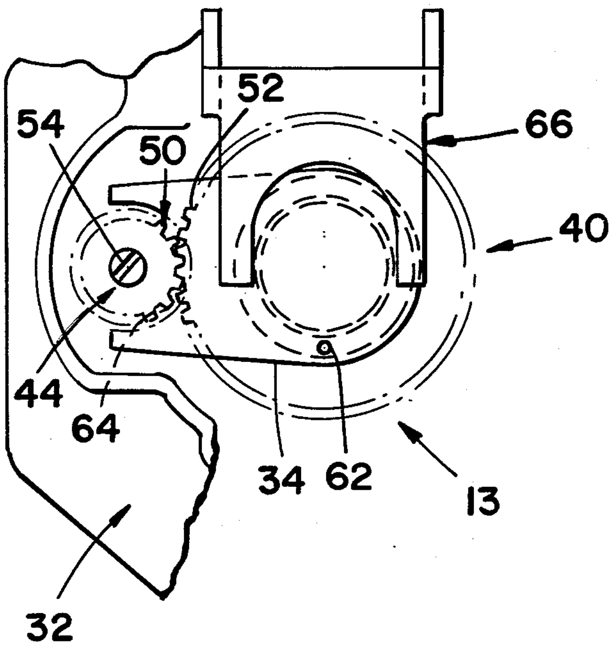
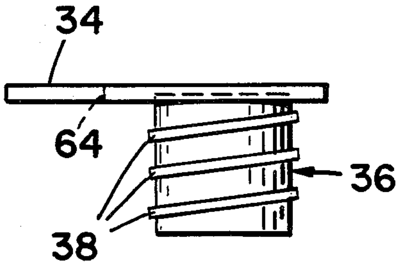
FIG_3
FIG_2
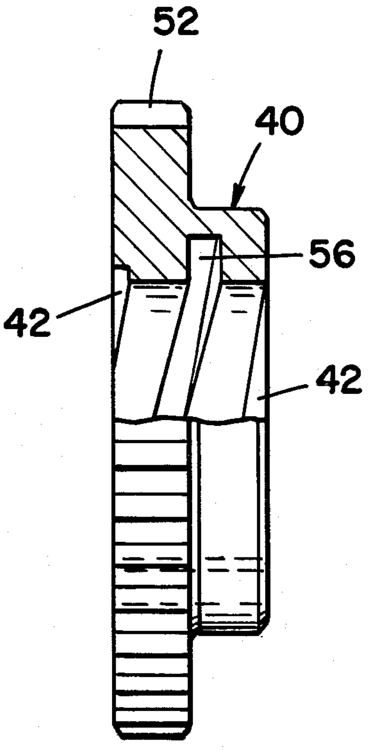
FIG_4
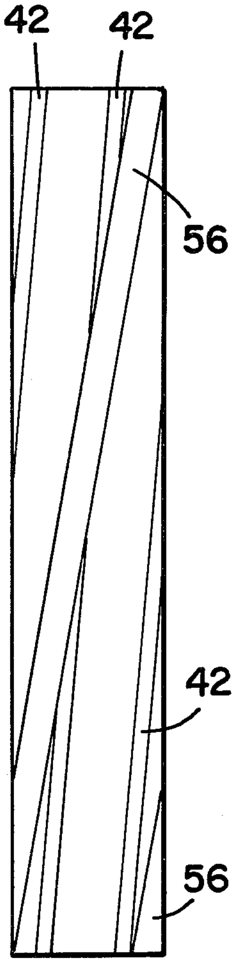
FIG_5

ADJUSTABLE REGULATION GOVERNOR

BACKGROUND OF THE INVENTION

This invention relates to governor operation for a fuel injection pump or the like, and most particularly, to apparatus for providing selective adjustment of the main governor spring of such a governor.

In the use of a fuel injection pump for an engine or the like, it is well known to provide a governor having interacting springs and fly-weight means (see, for example, U.S. Pat. No. 3,915,140 to Parks et al, assigned to the assignee of this invention). The operating characteristics of the engine are to an extent dependent on the characteristics of the main governor spring in such a system. For example, a main governor spring with a relatively high spring rate will provide less governor sensitivity while providing a relatively high "speed droop" characteristic, fully described in U.S. Pat. No. 3,915,140, cited above. Conversely, providing the main governor spring to be of a relatively lower spring rate tends to increase the sensitivity of the operation of the governor, while decreasing speed droop.

Depending on the desired operating characteristics of the engine, it will therefore be understood that under such varying conditions, it is desirable to provide that the main governor spring be of relatively higher or lower spring rate.

SUMMARY OF THE INVENTION

It is accordingly an object of this invention to provide means for providing precise control of the main governor spring of a governor for a fuel injection pump, to provide proper spring rate characteristics in line with chosen operating characteristics of an engine associated with the fuel injection pump.

It is a further object of this invention to provide an apparatus which, while fulfilling the above object, allows for easy and convenient variation of the spring rate of the main governor spring.

Broadly stated, the apparatus is provided for selectively varying the spring rate of a helical spring, comprising a first member defining threads of a first pitch, and a second member defining threads of the first pitch in threaded engagement with the threads of the first member. Further included is a second member defining helical channel means of a second pitch different from the first pitch. Further provided is a reaction member, the helical spring being in contact with the reaction member and having a portion disposed through the helical channel means. Rotation of the second member relative to the first member selectively varies the spring rate of the helical spring.

BRIEF DESCRIPTION OF THE DRAWINGS

These and other objects of the invention will become apparent from a study of the following specification and drawings, in which:

FIG. 2 is a view taken along the line II—II of FIG. 1;

FIG. 3 is a plan view of the threaded first member of the apparatus;

FIG. 4 is a view, partially in section, of the threaded second member of the apparatus; and FIG. 5 is a developmental view of the threads and helical channel means defined by the second member.

DESCRIPTION OF THE PREFERRED EMBODIMENT

Figure 1:
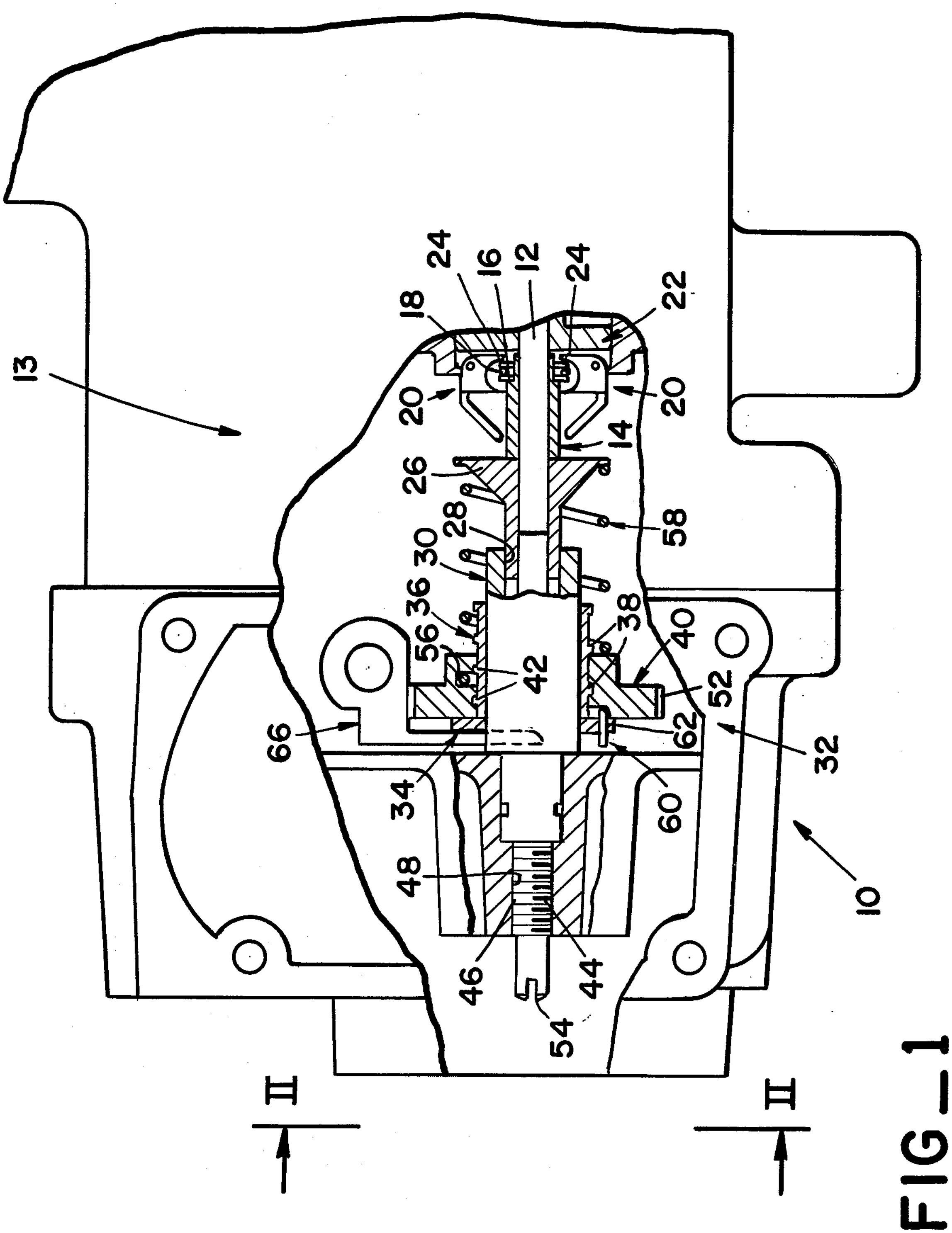
FIG. 1 is a view, partially in section, of a governor mechanism including the present invention.

Shown in FIG. 1 is a governor mechanism generally indicated at 10 and cooperating with a fuel pump rack bar 12 of a fuel injection pump 13 associated with an engine. The fuel pump rack bar 12 controls the supply of fuel to the engine. The fuel pump rack bar 12 has secured thereto a collar 14 having a stepped portion 16 against which a bearing 18 is disposed. A pair of fly-weights 20 are mounted to a member 22 rotatable with engine rotation, and have portions 24 which bear against the bearing 18 to move the rack bar 12 leftwardly against the force of a spring 58, the slowing down of rotation on the engine allowing the fly-weights 20 to move inwardly to allow the rack bar 12 to move rightwardly under the urging of such spring 58, all in accordance with well known operation.

A reaction member 26 is secured to the extending end of the rack bar, in contact with the collar 14. The reaction member 26 is slidably disposed within the bore 28 of a guide member 30 secured relative to the housing 32 of the pump 13. The guide member 30 has slidably mounted thereon a plate and sleeve assembly 34,36. The sleeve 36 defines external threads 38 of a first, certain pitch. A second, outer member 40 defines a bore in turn defining internal threads 42 of the same pitch as the threads 38 on the sleeve 36. Thus, it is to be seen that rotation of the member 40 relative to the sleeve 36 moves the member 40 axially along the sleeve 36.

An adjustment member 44 has a threaded portion 46 threadably engaged with the threads of a bore 48 defined by the housing 32, and extends along the guide member 30 inwardly of the housing 32. Adjacent the inner end of the adjustment member 44 is a toothed portion 50, the teeth of which are in engagement with teeth 52 defined by the outer periphery of the member 40. The member 44 includes a slotted, exposed end 54, which, it will be seen, may be easily turned by means of insertion of a screwdriver into the slot and the turning thereof.

The member 40 defines additional internal threads in the form of internal helical channel means 56. The pitch of the helical channel means 56 is greater than the pitch of the threads 38, in fact being twice the pitch of the threads 38 (see FIG. 5). A main governor spring 58 is disposed about the guide 30 and in contact with the reaction member 26. The spring 58 is helically wound and extends into and through the helical channel means 56, the extended end 60 of the helical spring 58 exiting from the helical channel means 56 and passing through an aperture 62 defined by the plate 34. The assembly made up of plate 34 and sleeve 36 is held from rotation relative to the guide 30 by means of a recess 64 defined by the plate 34, in which is rotatably seated the toothed portion 50 of the adjustment member 44.

With the apparatus set up as thus far described, it will be understood by one skilled in the art that the desired engine speed may be set by adjusting the position of a bifurcated lever 66, in contact with the plate 34 to apply the necessary force to the helical main governor spring 58.

With the assembly in such state as shown in FIG. 1, the helical main governor spring 58 provides a certain spring constant, the spring 58 being under compression between the reaction member 26 and member 44. If it is desired that the spring constant of the helical main governor spring 58 be varied, a screwdriver or the like is applied to the slot in the exposed end 54 of the adjustment member 44, and rotation of the screwdriver rotates the adjustment member 44. Such rotation of the adjustment member 44 in turn rotates the member 40 relative to the sleeve 36, through the engagement of the teeth on the portion of the adjustment member 44 and the outer periphery of the member 40. Since the plate and sleeve assembly 34,36 is held from rotation relative to the guide 30 through the means described above, the rotation of the member 40 relative to the sleeve 36 will cause the member 40 to move along the sleeve 36 at a certain rate, depending on the pitch of the threads 38,42. However, since the pitch of the helical channel means 56 is greater than the pitch of the threads 38,42, coils of the helical spring 58 will be drawn into the member 40 and moved leftwardly relative to the sleeve 36 at a rate faster than the member 40 is moving rightwardly relative to the sleeve 36. Thus, the portion of the spring 58 between the reaction member 26 and the member 40 is allowed to expand to an extent, and also there is actually less spring material between the reaction member 26 and the member 40, since some spring material from the portion of the spring 58 between the member 40 and the reaction member 26 is being drawn and forced leftwardly of the member 40, changing the spring rate of the spring 58.

It will be seen, of course, that rotation of the adjustment member 44 in the opposite direction causes the apparatus to operate in exactly the reverse manner, again varying the spring rate as selected.

It is to be seen that the adjustment of the adjustment member 44 varies the spring rate of the main governor spring 58, to in turn provide precise control of governor sensitivity. The spring rate of the main governor spring 58 may be in fact easily and conveniently chosen to meet the operating requirements of the engine with which the fuel injection pump is associated. Through the use of the threads 38,42 and channel means 56, it is possible to change regulation with very little speed change and to eliminate engine overspeeding associated with other designs.

What is claimed is:

1. Apparatus for selectively varying the spring rate of a helical spring comprising:

a first member defining threads of a first pitch;

a second member defining threads of the first pitch in threaded engagement with the threads of the first member;

the second member defining helical channel means of a second pitch different from the first pitch;

a reaction member;

the helical spring being in contact with the reaction member and having a portion disposed through the helical channel means;

whereby rotation of the second member relative to the first member selectively varies the spring rate of the helical spring.

2. The apparatus of claim 1 wherein the first member defines external threads, and the second member defines internal threads.

3. The apparatus of claim 2 wherein the second member defines internal helical channel means.

4. The apparatus of claim 1 wherein the pitch of the helical channel means is greater than the pitch of the threads.

5. The apparatus of claim 4 wherein the pitch of the helical channel means is substantially twice the pitch of the threads.

6. A control apparatus for a fuel injection pump including a control bar, which control apparatus comprises:

a movable first member defining threads of a first pitch;

a second member defining threads of the first pitch in threaded engagement with the threads of the first member;

the second member defining helical channel means of a second pitch different from the first pitch;

a reaction member connected to the control bar of the fuel injection pump;

a helical spring in contact with the reaction member and having a portion disposed through the helical channel means;

whereby rotation of the second member relative to the first member selectively varies the spring rate of the helical spring.

7. The apparatus of claim 6 wherein the first member defines external threads, and the second member defines internal threads.

8. The apparatus of claim 7 wherein the second member defines internal helical channel means.

9. The apparatus of claim 6 wherein the pitch of the helical channel means is greater than the pitch of the threads.

10. The apparatus of claim 9 wherein the pitch of the helical channel means is substantially twice the pitch of the threads.

11. The apparatus of claim 10 wherein the first member defines external threads, and the second member defines internal threads.

12. The apparatus of claim 11 wherein the second member defines internal helical channel means.

* * * * *